United States Patent
Katou

(10) Patent No.: US 6,885,292 B2
(45) Date of Patent: Apr. 26, 2005

(54) TIRE CONDITION MONITORING APPARATUS

(75) Inventor: Michiya Katou, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 50 days.

(21) Appl. No.: 10/677,652

(22) Filed: Sep. 24, 2003

(65) Prior Publication Data

US 2004/0155761 A1 Aug. 12, 2004

(30) Foreign Application Priority Data

Nov. 1, 2002 (JP) ........................................ 2002-320207

(51) Int. Cl.⁷ ............................................. B60C 23/00
(52) U.S. Cl. ...................... 340/445; 340/447; 340/444; 47/146.5
(58) Field of Search .............................. 340/445, 442, 340/447, 449, 438, 444; 73/146, 146.5; 116/34 R, 34 A, 34 B; 701/2, 29

(56) References Cited

U.S. PATENT DOCUMENTS 5,140,851 A * 8/1992 Hettich et al. ............. 73/146.5
5,473,938 A * 12/1995 Handfield et al. .......... 73/146.5
5,741,966 A * 4/1998 Handfield et al. .......... 73/146.5
6,725,712 B1 * 4/2004 King et al. ................ 73/146.5

FOREIGN PATENT DOCUMENTS

JP        10-104103       4/1998   .......... G01L/17/00

* cited by examiner

Primary Examiner—Phung Nguyen
(74) Attorney, Agent, or Firm—Marsh Fischmann & Breyfogle LLP

(57) ABSTRACT

Each of transmitters includes a condition detecting device for detecting the condition of a corresponding tire, and an acceleration detecting device for detecting the direction of acceleration accompanying rotation of the corresponding tire. Each transmitter wirelessly transmits data containing data representing the condition of the tire and data representing the direction of the acceleration. A repeater receives data from the transmitters provided in front tires or data from the transmitters provided in rear tires. When receiving data from any of the transmitters, the repeater wirelessly transmits a response signal when a predetermined period has elapsed after the reception of the data. A receiver receives data from the transmitters and the response signal from the repeater. Based on whether the receiver has received the response signal from the repeater after receiving data from one of the transmitters, the receiver determines the position of the tire in which the transmitter that is the source of the data is provided.

14 Claims, 3 Drawing Sheets

TIRE CONDITION MONITORING APPARATUS

BACKGROUND OF THE INVENTION

The present invention relates to a wireless tire condition monitoring apparatus that permits a driver in a vehicle passenger compartment to check the conditions of tires, such as the air pressure.

Wireless tire condition monitoring apparatuses that allow a driver in a vehicle passenger compartment to check the conditions of vehicle tires have been used. One such monitoring apparatus includes transmitters. Each transmitter detects condition, such as the pressure and the temperature, of an associated tire, and wirelessly transmits data representing the detected tire conditions. A receiver for receiving the data from the transmitters is provided on the vehicle body.

The transmitters are each provided in a tire attached to the vehicle. The receiver includes reception antennas each corresponding to one of the transmitters. Each reception antenna induces a voltage that corresponds to the electric field strength of radio waves transmitted from the corresponding transmitter. To obtain necessary data from voltage signals induced by the reception antennas, the receiver processes the voltage signals.

When receiving data, the receiver must distinguish which one of the transmitters has wirelessly sent the data. Accordingly, to distinguish one of the antennas that has the greatest level of induced voltage, in a prior art device disclosed in Japanese Laid-Open Patent Publication No. 10-104103, the receiver uses a multiplexer circuit to switch the reception antennas such that only one of the antennas is activated at a time. The antenna that is activated when the voltage signal level is highest is determined to be the closest one to the transmitter that has sent data. Thus, the positions of the tires are determined.

However, in the configuration of the prior art device, the number of the reception antennas must be equal to the number of the tires. Also, to increase the level of induced voltage, each reception antenna must be located in the vicinity of the corresponding tire, which limits the method for installing the antennas.

In addition, while awaiting signals from the transmitters, the multiplexer circuit must be kept activated to receive voltage signals from all the reception antennas. This increases power consumption.

Further, since only one of the reception antennas is activated at a time to distinguish the transmitters, the level of each obtained voltage signal is relatively low. Therefore, it is difficult to perform the distinction procedure of the transmitters accurately and reliably.

SUMMARY OF THE INVENTION

Accordingly, it is an objective of the present invention to provide a tire condition monitoring apparatus that is capable of determining the positions of tires with a small power consumption.

To achieve the foregoing and other objectives and in accordance with the purpose of the present invention, a tire condition monitoring apparatus for monitoring conditions of tires is provided. The tires include a front tire provided at a front section of a vehicle and a rear tire provided at a rear section of the vehicle. The apparatus includes a plurality of transmitters, a repeater, and a receiver. Each of the transmitters is provided in one of the tires. Each transmitter includes condition detecting means for detecting the condition of the corresponding tire, and acceleration detecting means for detecting the direction of acceleration accompanying rotation of the corresponding tire. Each transmitter wirelessly transmits data containing data representing the condition of the tire detected by the condition detecting means and data representing the direction of the acceleration detected by the acceleration detecting means. The repeater receives data from the transmitter provided in the front tire or data from the transmitter provided in the rear tire. When receiving data from any of the transmitters, the repeater wirelessly transmits a response signal when a predetermined period has elapsed after the reception of the data. The receiver receives data from the transmitters and the response signal from the repeater. Based on whether the receiver has received the response signal from the repeater after receiving data from one of the transmitters, the receiver determines the position of the tire in which the transmitter that is the source of the data is provided.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment will now be described with reference to the drawings. The apparatus 1 is used in a vehicle such as an automobile.

Figure 1:
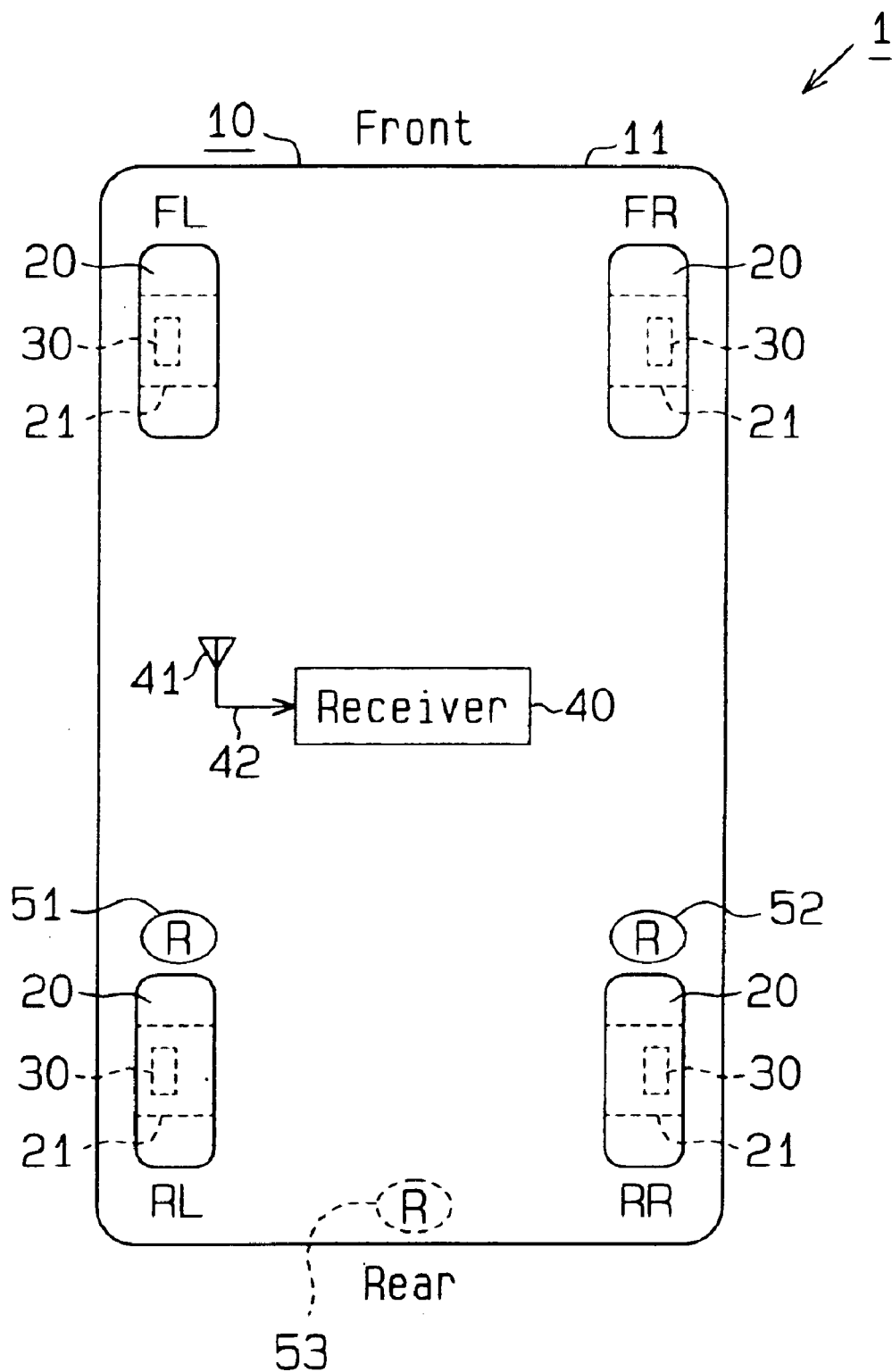
FIG. 1 is a diagrammatic view showing a tire condition monitoring apparatus according to one embodiment of the present invention.

As shown in FIG. 1, the vehicle 10 has left and right front wheels (FL, FR) and left and right rear wheels (RL, RR) and tires 20. Each tire 20 corresponds to one of the wheels (FL, FR, RL, RR).

The tire condition monitoring apparatus 1 includes four transmitters 30 and a receiver 40. Each transmitter 30 is located in one of the tires 20 of the vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure and the temperature of the tire 20. The transmitter 30 then wirelessly transmits data containing air pressure data and temperature data.

The receiver 40 is located at a predetermined position on the body frame 11 and is activated by electricity of a battery (not shown) of the vehicle 10. The receiver 40 includes a single reception antenna 41. The reception antenna 41 is connected to the receiver 40 with a cable 42. The receiver 40 receives data wirelessly transmitted by the transmitters 30 through the reception antenna 41.

The apparatus 1 includes repeaters 51, 52, which are located in the vicinity of the rear wheels RL, RR. For example, the repeater 51 is located in the wheel well of the rear left wheel RL, and the repeater 51 is located in the wheel well of the rear right wheel RR.

Figure 2:
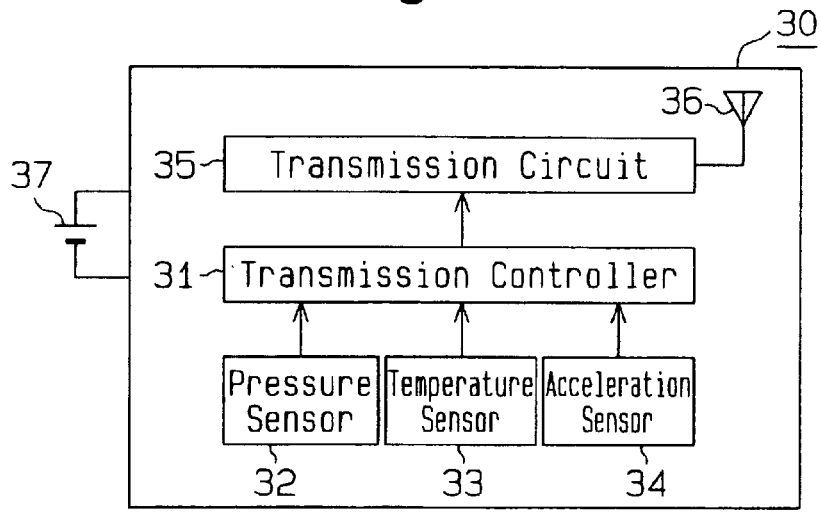
FIG. 2 is a block diagram showing one of the transmitters shown in FIG. 1.

As shown in FIG. 2, each transmitter 30 includes a transmission controller 31, which is a microcomputer. The transmission controller 31 includes, for example, a central processing unit (CPU), a read only memory (ROM), and a random access memory (RAM). A unique ID code is registered in an internal memory, for example, the ROM, of the transmission controller 31. The ID code is used to distinguish the associated transmitter 30 from the other three transmitters 30.

The tire pressure sensor 32 measures the air pressure in the interior of the associated tire 20 and provides the transmission controller 31 with pressure data, which is obtained from the measurement. The temperature sensor 33 measures the temperature in the interior of the associated tire 20 and provides the transmission controller 31 with temperature data, which is obtained from the measurement. The pressure sensors 32 and the temperature sensors 33 function as condition detecting means.

Each transmission controller 31 sends the air pressure data, the temperature data, and the registered ID code to a transmission circuit 35.

The transmission circuit 35 encodes and modulates the data sent from the transmission controller 31. The transmission circuit 35 then wirelessly sends the data through the antenna 36.

Each transmitter 30 is provided with a battery 37. The transmitter 30 is driven by electricity of the battery 37.

The transmission controller 31 of each transmitter 30 controls the pressure sensor 32 and the temperature sensor 33 to perform measurement at predetermined time intervals (for example, every 15 seconds). Also, the transmission controller 31 controls the transmission circuit 35 to perform periodic transmission every time the pressure sensor 32 completes a predetermined number of (for example, 40 cycles of) measurements. Further, when detecting an abnormality of the pressure in the tire 20 or of the temperature in the tire 20, the controller 31 causes the transmission circuit 35 to perform transmission irrespective of timing of the periodic transmission.

The timing of transmission of the transmitters 30 are regulated such that each transmitter 30 performs transmission at a timing different from those of the other transmitters 30. Therefore, two or more of the transmitters 30 do not perform transmission simultaneously.

Each transmitter 30 has an acceleration sensor 34. The acceleration sensor 34 outputs acceleration data to the transmission controller 31. The acceleration data represents the direction of acceleration based on the rotation direction of the corresponding tire 20.

Figure 3A:
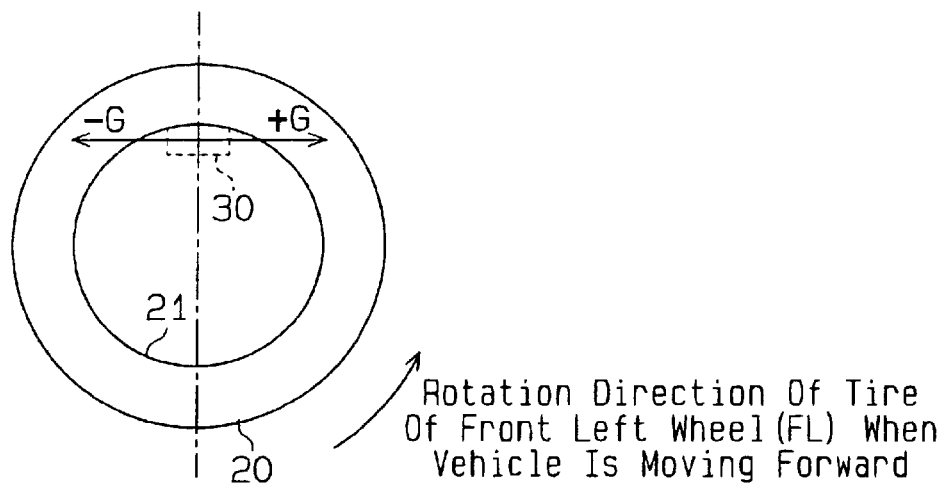
FIG. 3(a) is a diagram showing the direction of acceleration produced when a tire is rotated.

For example, as shown in FIG. 3(a), the tire 20 of the front left wheel FL outputs an acceleration data of +G to the transmission controller 31 when the vehicle 10 is moving forward, and outputs an acceleration data of −G to the transmission controller 31 when the vehicle 10 is moving backward. As viewed from the right of the vehicle 10, the tire 20 of the front right wheel FR rotates in the reverse direction relative to rotation of the tire 20 of the front left wheel FL when the vehicle 10 is moving forward. Therefore, the tire 20 of the front right wheel FR outputs an acceleration data of −G to the transmission controller 31 when the vehicle 10 is moving forward, and outputs an acceleration data of +G to the transmission controller 31 when the vehicle 10 is moving backward. The tires 20 of the rear left wheel RL and the rear right wheel RR operate in the same manner as the front wheels FL and FR. Therefore, when receiving data from any of the transmitters 30, the receiver 40 is capable of determining whether the data has been sent from the tire 20 of one of the front and rear left wheels FL, RL or from the tire 20 of one of the front and rear right wheels FR, RR based on acceleration data of the acceleration sensor 34.

Each transmission controller 31 outputs acceleration data from the acceleration sensor 34 to the transmission circuit 35. Each transmission controller 31 outputs the inputted acceleration data to the transmission circuit 35. The transmission circuit 35 encodes and modulates the acceleration data sent from the transmission controller 31. The transmission circuit 35 then wirelessly sends the data through the antenna 36. That is, the transmission circuit 35 encodes and modulates the acceleration data together with the pressure data, the temperature data, and the ID code. The transmission circuit 35 then wirelessly sends the data through the antenna 36.

The repeaters 51, 52 will now be described with reference to FIG. 4.

Figure 4:
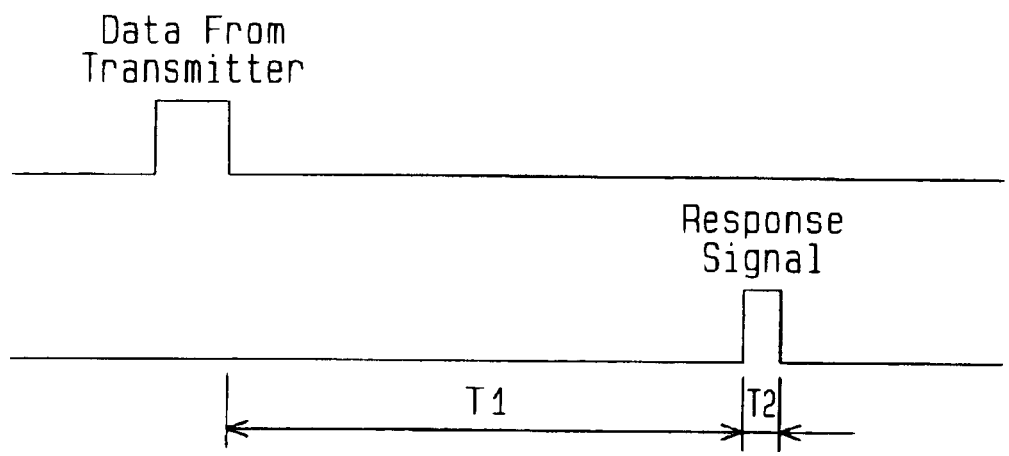
FIG. 4 is a timing chart showing a reception signal of a repeater.

As shown in FIG. 4, when receiving data from any of the transmitters 30 corresponding to the rear wheels, each of the repeaters 51, 52 wirelessly transmits a response signal T2 when a predetermined period T1 has elapsed. The frequency of the radio waves transmitted by the repeaters 51, 52 is the same as that of the radio waves transmitted by the transmitters 30. Therefore, radio waves transmitted by the repeaters 51, 52 and the transmitters 30 all can be received by the same receiver 40.

When radio waves from each transmitter 30 are transmitted, the electric field strength attenuates in proportion to the distance from the transmitter 30. The electric field strengths of the transmitters 30 in the tires 20 shown in FIG. 1 are the same. However, the repeater 51 provided at the rear left wheel well receives radio waves from the transmitter 30 of the tire 20 of the rear left wheel RL at a stronger level than radio waves from the other transmitters 30.

Through experiments, it has been confirmed that, if the electric field strength of transmission output from the transmitter 30 is 50 [dBμV/m] at a far point 3 [m] away from the transmitter 30, and if the sensitivity of the repeater 51 at the rear left wheel RL is −90 [dBm], the repeater 51 only receives radio waves from the transmitter 30 of the tire 20 of the rear left wheel RL. In other words, it has been confirmed that radio waves from the transmitters 30 of the tires 20 of the front left wheel FL, the front right wheel FR, and the rear right wheel RR attenuate and are scarcely received by the repeater 51. Likewise, it has been confirmed that radio waves from the transmitters 30 of the tires 20 of the front left wheel FL, the front right wheel FR, and the rear left wheel RL attenuate and are scarcely received by the repeater 52.

Therefore, if the receiver 40 receives the response signal T2 after the predetermined period T1 has elapsed since the receiver 40 receives data that has been wirelessly transmitted from any of the transmitters 30, the receiver 40 is capable of determining that the tire 20 corresponding to the transmitter 30 that has sent the data is attached to one of the rear wheels RL, RR. On the other hand, if the receiver 40 does not receive the response signal T2 after the predetermined period T1 has elapsed since the receiver 40 receives data that has been wirelessly transmitted from any of the transmitters 30, the receiver 40 is capable of determining that the tire 20 corresponding to the transmitter 30 that has sent the data is attached to one of the front wheels FL, FR.

The receiver 40 will now be described with reference to FIG. 5.

Figure 5:
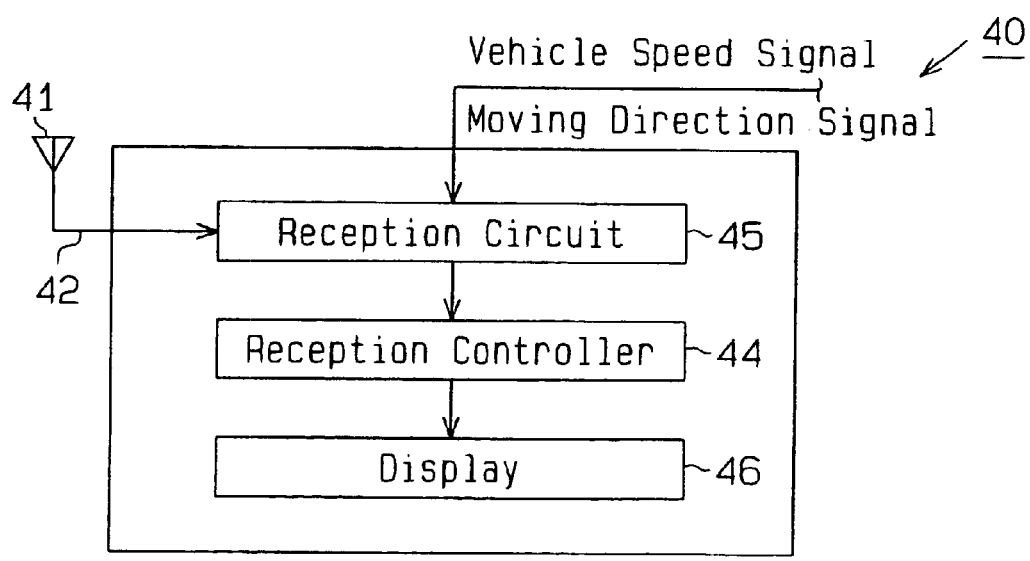
FIG. 5 is a block diagram showing a receptor.

As shown in FIG. 5, the receiver 40 includes a reception controller 44, a reception circuit 45, and a display 46. The reception controller 44 processes data received with the reception antenna 41. The reception controller 44, which is, for example, a microcomputer, includes a CPU, a ROM, and a RAM.

The reception circuit 45 receives data wirelessly transmitted by the transmitters 30 and response signals wirelessly transmitted by the repeaters 51, 52 through the reception antenna 41. The reception circuit 45 demodulates and decodes the received data and response signals, and sends the data and signals to the reception controller 44.

Based on the acceleration data from the acceleration sensor 34 and whether there is a response signal T2 from the repeater 51 or 52, the reception controller 44 determines which one of the tires 20 has sent a signal.

The reception controller 44 receives a signal representing the speed of the vehicle 10, or a vehicle speed signal, from, for example, a speedometer (not shown) provided at a predetermined position in the vehicle 10. The reception controller 44 also receives a signal representing the direction of movement of the vehicle 10, or a moving direction signal, from, for example, a transmission (not shown) provided at a predetermined position in the vehicle 10. The transmission outputs a signal representing the position of the shift lever as the moving direction signal to the reception controller 44. Based on the received moving direction signal, the reception controller 44 determines whether the vehicle 10 is moving forward or backward. The reception controller 44 determines that the vehicle 10 is moving backward only when the shift lever is at the reverse position. When the shift lever is at a position other than the reverse position, the reception controller 44 determines that the vehicle 10 is moving forward.

As a result, based on the vehicle speed signal and the moving direction signal, the reception controller 44 is capable of determining the rotating direction of the tires 20. Therefore, based on the acceleration data from the acceleration sensor 34, the vehicle speed signal, and the moving direction signal, the receiver 40 is capable of determining whether data has been sent from the tire 20 of one of the front and rear left wheels FL, RL or from the tire 20 of one of the front and rear right wheels FR, RR.

The reception controller 44 stores information regarding the position of the tire 20 associated with the transmitter 30 that has sent a signal, for example, in the RAM. Specifically, when storing the information of the position of the tire 20 corresponding to the transmitter 30 that has sent a signal with the ID code, the reception controller 44 associates the information with the ID code contained in the received data.

Based on the received data and the response signal, the reception controller 44 obtains the pressure and the temperature of the tire 20 that is associated with the transmitter 30 that is the source of the received data. The reception controller 44 causes the display 46 to display data related to the pressure and the temperature of the tire 20 associated with the transmitter 30 that is the source of the received data. The reception controller 44 also causes the display 46 to display the position of the tire 20 corresponding to the data. Particularly, when there is an abnormality in the pressure of the tire 20, the reception controller 44 displays warning on the display 46. The display 46 functions as notifying means.

This embodiment has the following advantages.

(1) Each transmission circuit 35 wirelessly transmits the acceleration data as well as data representing the state of the corresponding tire 20. Therefore, the receiver 40 is capable of determining whether received data has been sent from the tire 20 of one of the front and rear left wheels FL, RL or from the tire 20 of the front and rear right wheels FR, RR based on acceleration data of the acceleration sensors 34. When receiving data from the transmitters 30 of the tires 20 of the rear left wheel RL and the rear right wheel RR, the repeaters 51, 52 transmit the response signal T2 after the predetermined period T1 has elapsed. Therefore, based on whether the receiver 40 has received the response signal T2 from the repeaters 51, 52, the receiver 40 is capable of determining whether received data has been sent from the tire 20 of one of the front wheels FL, FR or from the tire 20 of the rear wheels RL, RR. Thus, the receiver 40 is capable of determining the position of the tire 20 that is associated with the transmitter 30 that is the source of the received data.

(2) The reception controller 44 receives the vehicle speed signal and the moving direction signal. Therefore, the receiver 40 is capable of obtaining the rotation direction of the tires 20 while the vehicle 10 is moving. As a result, the receiver 40 is capable of accurately determining whether received data has been sent from the tire 20 of one of the front and rear left wheels FL, RL or from the tire 20 of one of the front and rear right wheels FR, RR.

(3) The reception controller 44 stores information regarding the position of the tire 20 corresponding to the transmitter 30 that has sent a signal in the RAM. Therefore, when a new tire 20 is attached to the vehicle 10 or when the positions of the four tires 20 relative to the vehicle 10 are changed, the receiver 40 is capable of determining the position of the tire 20 that is associated with the transmitter 30 that is the source of the received data. Thus, the reception controller 44 is capable of automatically storing information regarding the position of the tire 20 corresponding to the transmitter 30 that has sent a signal. An initial registration need not be performed manually.

It should be apparent to those skilled in the art that the present invention may be embodied in many other specific forms without departing from the spirit or scope of the invention. Particularly, it should be understood that the invention may be embodied in the following forms.

The repeaters 51, 52 shown in FIG. 1 may be replaced with a single repeater 53 shown in FIG. 1. The repeater 53 is provided at a position in the vehicle body frame 11 that is substantially at the midpoint between the rear wheels RL, RR. In this configuration, when receiving data from the transmitters 30 of the tires 20 of the rear left wheel RL and the rear right wheel RR, the repeater 53 transmits the response signal T2 after the predetermined period T1 has elapsed. The same advantages as the previous embodiment are obtained with the single repeater 53.

The repeaters 51, 52 may be provided in the wheel wells of the front wheels FL, FR. In this configuration, based on whether the receiver 40 has received the response signal T2 from the repeaters 51, 52, the receiver 40 is capable of determining the tire 20 associated with the transmitter 30 that is the source of the received data.

A single repeater 53 may be provided at a position in the vehicle body frame 11 that is substantially at the midpoint between the front wheels FL, FR.

As long as the source of received data is determined to be the transmitter 30 in the tire 20 of one of the front wheels FL, FR or the transmitter 30 in the tire 20 of one of the rear wheels RL, RR, the repeaters 51 to 53 may be provided at any positions in the vehicle body frame 11. Specifically, the repeaters 51 to 53 may be provided in positions close to the tires 20, for example, in a front spoiler, a rear spoiler, a bumper, or a fender.

In the repeaters 51 to 53, the predetermined period T1 may be changed. Also, the time at which the response signal T2 is transmitted may be changed. Alternatively, a specific code may be transmitted as the response signal T2.

Figure 3B:
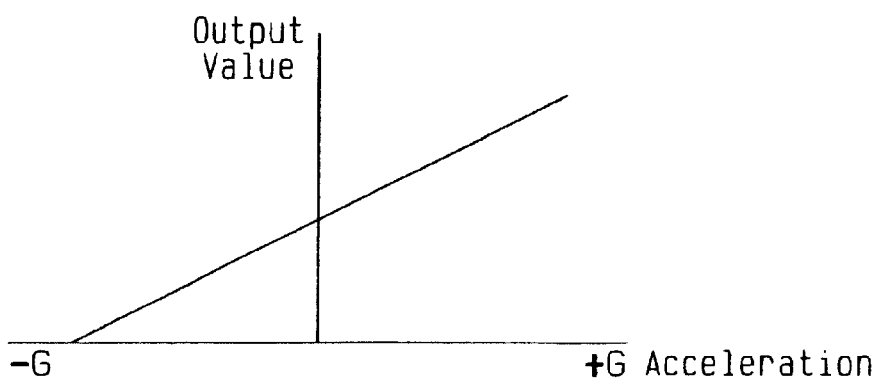
FIG. 3(b) is a graph showing the relationship of an output value relative to the magnitude of acceleration.

Instead of using the vehicle speed signal, the speed of the vehicle 10 may be determined according to the degree of the acceleration data from the acceleration sensors 34 as shown in FIG. 3(b). Specifically, the output value of the acceleration data is converted into the speed by an integration circuit to determine the speed of the vehicle 10. In this configuration, the rotation direction of the tires 20 is determined based on the speed of the vehicle 10 and a signal representing the position of the shift lever. Thus, the receiver 40 is capable of determining whether received data has been sent from the tire 20 of one of the front and rear left wheels FL, RL or from the tire 20 of one of the front and rear right wheels FR, RR.

When there is an abnormality in the pressure or the temperature of the tire 20, the abnormality may be indicated by a sound. In addition, a speaker that is mounted on the vehicle 10 in advance may be used as an informing device.

The temperature sensor 33 may be omitted. In this case, the transmitter 30 has the minimum functions. This reduces the cost.

Air pressure data transmitted by the transmitter 30 may indicate the value of the air pressure or whether the air pressure is within a permissible range.

Other than four-wheeled vehicles, the present invention may be applied to two-wheeled vehicles, such as bicycles and motor cycles, multi-wheeled busses, multi-wheeled towed vehicles and industrial vehicles, such as forklifts. When the present invention is applied to a towed vehicle, the receiver 40 and the display 46 are provided in the tractor.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring conditions of tires, the tires including a front tire provided at a front section of a vehicle and a rear tire provided at a rear section of the vehicle, the apparatus comprising:
    a plurality of transmitters, each of which is provided in one of the tires, wherein each transmitter includes a condition detecting device for detecting the condition of the corresponding tire, and an acceleration detecting device for detecting the direction of acceleration accompanying rotation of the corresponding tire, wherein each transmitter wirelessly transmits data containing data representing the condition of the tire detected by the condition detecting device and data representing the direction of the acceleration detected by the acceleration detecting device;
    a repeater that receives data from the transmitter provided in the front tire or data from the transmitter provided in the rear tire, wherein, when receiving data from any of the transmitters, the repeater wirelessly transmits a response signal when a predetermined period has elapsed after the reception of the data; and
    a receiver that receives data from the transmitters and the response signal from the repeater, wherein, based on whether the receiver has received the response signal from the repeater after receiving data from one of the transmitters, the receiver determines the position of the tire in which the transmitter that is the source of the data is provided.

2. The tire condition monitoring apparatus according to claim 1, wherein:
    the receiver determines the rotation directions of the tires based on a speed and a moving direction of the vehicle.

3. The tire condition monitoring apparatus according to claim 1, wherein:
    based on whether the receiver has received the response signal from the repeater after receiving data from one of the transmitters, the receiver stores information of the position of the tire in which the transmitter is provided.

4. The tire condition monitoring apparatus according to claim 1, wherein:
    the repeater is mounted on the vehicle at a position in the vicinity of the tires.

5. The tire condition monitoring apparatus according to claim 1, wherein the receiver determines a speed of the vehicle in accordance with the magnitude of the acceleration data from the acceleration detecting device, and wherein, based on the speed and the moving direction of the vehicle, the receiver determines the rotation directions of the tires.

6. The tire condition monitoring apparatus according to claim 1, wherein, to receive data from the transmitters provided in the front tire or from the transmitters provided in the rear tire, the repeater is located in a front section or in a rear section of the vehicle.

7. The tire condition monitoring apparatus according to claim 1, wherein the vehicle has two front tires and two rear tires, wherein, based on the data representing the direction of the acceleration contained in the data from one of the transmitters, the receiver determines whether the transmitter that is the source of the data corresponds to one of the left tires or to one of the right tires, and wherein, based on whether the receiver has received the response signal from the repeater, the receiver determines whether the transmitter that is the source of the data corresponds to one of the front tires or to one of the rear tires, thereby determining the position of the tire.

8. The tire condition monitoring apparatus according to claim 1, wherein, based on whether the receiver has received the response signal from the repeater after receiving the data representing the direction of acceleration contained in the data from one of the transmitters, the receiver stores information of the position of the tire in which the transmitter is provided.

9. The tire condition monitoring apparatus according to claim 2, wherein the moving direction of the vehicle is based on a signal representing a position of a shift lever.

10. The tire condition monitoring apparatus according to claim 1, wherein the receiver includes a notifying device for notifying a passenger of the positions and the conditions of the tires.

11. A tire condition monitoring method for monitoring conditions of tires, the tires including front tires provided at a front section of a vehicle and rear tires provided at a rear section of the vehicle, the method comprising:

a first step including a condition detecting step for detecting the condition of each tire, and an acceleration detecting step for detecting the direction of acceleration accompanying rotation of the corresponding tire, wherein data containing data representing the detected condition of the tire and data representing the detected direction of the acceleration is wirelessly transmitted;

a second step, wherein, when a predetermined period has elapsed after the data transmitted in the first step is received, a response signal is wirelessly transmitted; and a step in which the data of the first step and the response signal of the second step are received, wherein the positions of the tires are determined based on whether the response signal of the second step has been received after the data of the first step is received.

12. The tire condition monitoring method according to claim 11, wherein:

the direction of the acceleration accompanying the rotation of the tire is determined based on a speed and a moving direction of the vehicle.

13. The tire condition monitoring method according to claim 11, further comprising:

a step in which, after the position of the tire is determined, information of the position of the tire is stored.

14. The tire condition monitoring method according to claim 11, wherein the speed of the vehicle is determined in accordance with the magnitude of the acceleration of the tire, and wherein, based on the speed and the moving direction of the vehicle, the rotation directions of the tires are determined.

* * * * *